US011346378B2

(12) United States Patent
Bonvallet

(10) Patent No.: US 11,346,378 B2
(45) Date of Patent: May 31, 2022

(54) LOCKING DEVICE FOR THE TRANSPORT AND USE ON, VEHICLES, WEARABLE EQUIPMENT, STATIONARY PLATFORMS, AND SPORTS EQUIPMENT

(71) Applicant: Mackenzie Caleb Bonvallet, Columbus, GA (US)

(72) Inventor: Mackenzie Caleb Bonvallet, Columbus, GA (US)

( * ) Notice: Subject to any disclaimer, the term of this patent is extended or adjusted under 35 U.S.C. 154(b) by 0 days.

(21) Appl. No.: 16/683,047

(22) Filed: Nov. 13, 2019

(65) Prior Publication Data

US 2021/0140453 A1 May 13, 2021

(51) Int. Cl.
*F16B 2/10* (2006.01)
*B63H 16/06* (2006.01)

(52) U.S. Cl.
CPC .............. *F16B 2/10* (2013.01); *B63H 16/06* (2013.01)

(58) Field of Classification Search
CPC ..... F16B 2/10; F16B 2/02; F16B 2/06; B63H 16/06; B63H 16/073
USPC ....... 248/689, 519, 523, 528, 534, 540, 541, 248/65, 74.1, 74.4, 89, 230.4, 231.51, 248/316.1, 316.5; 211/7, 85.7, 60.1, 62, 211/63, 68, 70.8
See application file for complete search history.

(56) References Cited

U.S. PATENT DOCUMENTS

| | | | | |
|---|---|---|---|---|
| 2,987,736 A * | 6/1961 | Wolff | ...................... | B63H 16/06 440/107 |
| 3,264,701 A * | 8/1966 | McClay, Jr. | ........... | B63H 16/06 24/452 |
| 3,512,227 A * | 5/1970 | Krawagna | ............... | A45C 13/26 248/113 |
| 4,089,087 A * | 5/1978 | Heitman | ................ | F16L 3/2235 24/329 |
| 4,947,777 A * | 8/1990 | Yoder | ..................... | A01K 91/08 114/221 R |
| 5,713,112 A * | 2/1998 | Genero | .................. | E05C 19/024 24/490 |
| 5,833,195 A * | 11/1998 | Haynes | .................. | F17C 13/084 248/316.5 |
| 8,573,576 B2 * | 11/2013 | Clark | ......................... | B25B 5/16 269/217 |
| 9,212,784 B2 * | 12/2015 | Frenal | ........................ | F17C 1/00 |
| 2007/0080265 A1 * | 4/2007 | Schaffer | ................ | F16L 3/1025 248/65 |
| 2011/0101190 A1 * | 5/2011 | Morren | ...................... | F16B 2/10 248/316.5 |

(Continued)

*Primary Examiner* — Eret C McNichols
*Assistant Examiner* — Michael McDuffie
(74) *Attorney, Agent, or Firm* — John L. Sotomayor

(57) ABSTRACT

The clamping device may comprise a platform base, a pair of locking claws, and a mount. The clamping device may be coupled to a base object via the mount. The clamping device may retain a clamped object to the base object using the pair of locking claws. An individual locking claw selected from the pair of locking claws may comprise an over-center linkage resulting in bistable positioning of the individual locking claw. The individual locking claw may transition from an open position to a closed position under the influence of a closing force. The individual locking claw may transition from the closed position to the open position under the influence of an opening force. As a non-limiting example, the clamping device may retain a paddle to a boat by clamping onto a shaft of the paddle.

6 Claims, 9 Drawing Sheets

(56) References Cited

U.S. PATENT DOCUMENTS

| | | | |
|---|---|---|---|
| 2012/0216738 A1* | 8/2012 | Altfather | F04B 9/14 |
| | | | 114/343 |
| 2013/0048822 A1* | 2/2013 | Liu | A62C 35/68 |
| | | | 248/316.5 |
| 2013/0193289 A1* | 8/2013 | Goffman | B62J 11/00 |
| | | | 248/231.51 |
| 2017/0259891 A1* | 9/2017 | Curnutte | A45F 5/021 |
| 2018/0235393 A1* | 8/2018 | Van Lieshout | A63J 1/02 |
| 2018/0346084 A1* | 12/2018 | Mitchell | B63H 16/067 |
| 2019/0145548 A1* | 5/2019 | Ball | F16L 3/18 |
| | | | 248/74.1 |
| 2019/0145549 A1* | 5/2019 | Gerardo | H02G 1/06 |
| | | | 248/49 |
| 2019/0276126 A1* | 9/2019 | Yepez | E02B 15/10 |

\* cited by examiner

LOCKING DEVICE FOR THE TRANSPORT AND USE ON, VEHICLES, WEARABLE EQUIPMENT, STATIONARY PLATFORMS, AND SPORTS EQUIPMENT

CROSS-REFERENCE TO RELATED APPLICATION

This application claims under 35 U.S.C. § 120, the benefit of the Provisional Application 62/760,977, filed Nov. 14, 2018, titled "NOVEL LOCKING DEVICE FOR THE TRANSPORT AND USE ON, VEHICLES, WEARABLE EQUIPMENT, AND WATERSPORTS EQUIPMENT" which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Field of the Invention

The present invention relates to the fields of equipment transportation and equipment security, more specifically, a novel locking device for the transport and use on, vehicles, wearable equipment, and watersports equipment.

Water sports and activities has started to become a fast-growing area of interest to all kinds of people everywhere. Whether it is rafting, stand up paddle boarding, or kayaking of all kinds on any body of water. When looking on the market to buy any type of water equipment such as a paddle it can get pricey.

Currently there is only one other competitor on the market called Dock Locks. They use a standard flexible cable with an outer rubber coating like the one used on bikes. The Docks Locks requires a set key and locking mechanism causing the user to have to rely on having those specific keys. The devices purpose is only to be wrapped around the paddle and a sturdy object next to your board for security. While locked up to a stationary object the device is not intended to be used during any transportation or usage.

When people are transporting their water equipment, they face many different drawbacks. One of which is the ease of transportation when walking along, but not limited to, the beach, river, or lake containing different surfaces and obstacles to have to maneuver around. When trying to reach an access point in the water users have to carry their board in one hand and the paddle in the other. Restricting what all they can carry in one trip since both hands are being used for only two pieces of equipment. Causing users to take a second trip for something else they might need or want to have with them.

One of the major drawbacks users face is damaging their equipment due to transportation. Various bodies of water require a significant amount of, but not limited to, maneuverability and stability to get in. When users are walking (other types of human transportation) they tend to have to use a hand to keep sturdy. In this case, one hand has around a thousand-dollar board while the other hand has a couple hundred-dollar paddle. Neither is a good option however, users end up scratching or damaging their equipment through, but not limited to, using it for stability, for maneuvering around obstacles, or other means when transporting. Due to the fact that there is no free hand available for, but not limited to, stability or to carry anything else needed results in a need for a more compact device application.

When it comes to usage many times people need two hands when using, but not limited to, a boat, kayak, paddleboard, or similar equipment ("boards"). One of the drawbacks users face is when having to, but not limited to, getting in or out of the board in any body of water. Since it requires two hands to keep the board stable many users run into the problem of not having anywhere to put their paddle. Once it hits the water it starts to drift further and further away from the user. Resulting, in extra unnecessary work to get the paddle or it drifts too far away and the couple hundred-dollar paddle is gone.

Storing a paddle, but not limited to, during transportation when driving on land and water is a major drawback for users. First, when it comes to land a user can buy a rack for their board to go on top of their car. However, the racks only cater to the board(s) so the users paddle(s) does not have a spot on the rack. Many paddles are almost as long as the board which can go the full length of the top of a car if not longer, varying in lengths not widths to adjust for the user's height. Therefore, many users face a problem with storing their paddle during transportation. This is also the case for many boats possessing racks that can accommodate the users board and not the paddle causing problems with finding a spot to store it securely. Both cases limit the amount of room and things users can take with them let alone if they try to accommodate for more than just one user.

Another drawback that comes with, but not limited to, transporting on land and water is the paddle sliding. This is due to the fact that some, but not limited to, paddles have a slippery outer coating or users even apply a, but not limited to, paste or wax that can cause the paddles surface to be more slippery. Resulting in the paddle sliding and a need for something to hold it in place while, but not limited to, transportation and usage.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
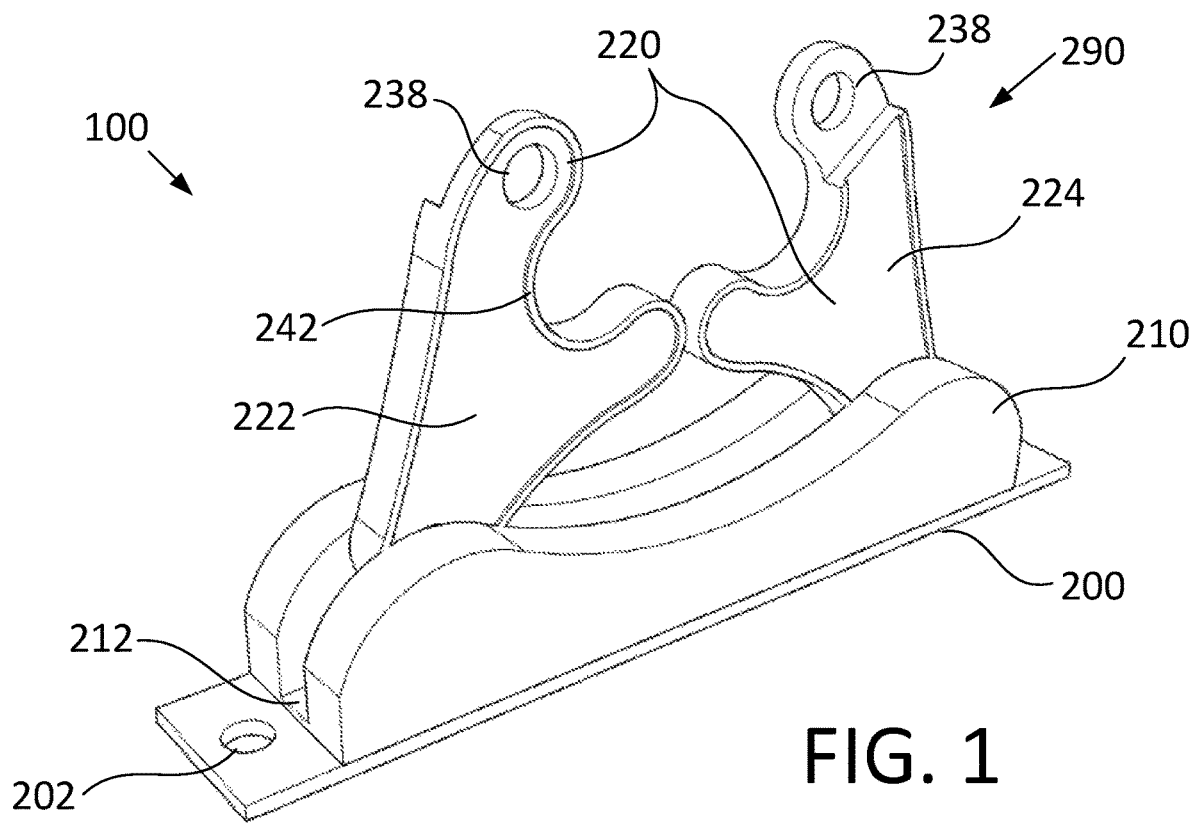
FIG. 1 is an isometric view of an embodiment of the disclosure illustrating the pair of claws in an open position.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" is an opening in a surface. Aperture may be synonymous with hole, slit, crack, gap, slot, or opening.

As used in this disclosure, a "backpack" is an item of luggage that comprises a harness arrangement that allows the backpack to be carried on the back of a user. The harness arrangement commonly comprises a plurality of shoulder straps.

As used in this disclosure, a "bushing" is a cylindrical aperture through which an object is guided and potentially secured. Bushings are sometimes used as protective linings to reduce friction and to provide a leak-proof seal.

As used in this disclosure, a "coating" refers to a substance that is applied to the exterior surface of an object such that the coating forms a new exterior surface of the object. A coating is commonly said to be formed as a layer. As a non-limiting example, paint is a common coating material.

As used in this disclosure, a "compression spring" is a wire coil that resists forces attempting to compress the wire coil in the direction of the center axis of the wire coil. The compression spring will return to its original position when the compressive force is removed.

As used herein, the words "couple", "couples", "coupled" or "coupling", refer to connecting, either directly or indirectly, and does not necessarily imply a mechanical connection.

As used herein, "flat spring" refers to a strip of material that stores energy when deflected by an external force. Despite the name, flat springs are not required to be flat and may, in fact, be bent or curved.

As used in this disclosure, "horizontal" is a directional term that refers to a direction that is perpendicular to the local force of gravity. Unless specifically noted in this disclosure, the horizontal direction is always perpendicular to the vertical direction.

As used herein, "mounting hardware" refers to mechanical devices that are used to attach one object to another, including devices whose only purpose is to improve aesthetics. As non-limiting examples, mounting hardware may include screws, nuts, bolts, washers, crossbars, hooks, collars, nipples, standoffs, knobs, caps, plates, rails, and brackets.

As used in this disclosure, a "notch" is an indentation formed in an edge or a cavity or aperture formed within a surface.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "rod" is a straight structure in which two dimensions of the structure appear thin relative to a third dimension of the straight structure.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "tension spring", also commonly referred to as an extension spring, is a wire coil that resists forces attempting to pull the wire coil in the direction of the center axis of the wire coil. The tension spring will return to its original position when the pulling force is removed.

As used in this disclosure, a "textile" is a material that is woven, knitted, braided or felted. Synonyms in common usage for this definition include fabric and cloth.

As used in this disclosure, a "torsion spring" is a mechanical device that stores mechanical energy through an opposing torque when the mechanical device is twisted. The torsion spring will return to its original relaxed shape when the twisting force is removed.

As used in this disclosure, a "track" is a device that is used to control the path of motion of an object in at least one dimension.

As used in this disclosure, "vertical" refers to a direction that is parallel to the local force of gravity. Unless specifically noted in this disclosure, the vertical direction is always perpendicular to horizontal.

The clamping device (hereinafter invention) may comprise a platform base, a pair of locking claws, and a mount. The invention may be coupled to a base object via the mount. The invention may retain a clamped object to the base object using the pair of locking claws. An individual locking claw selected from the pair of locking claws may comprise an over-center linkage resulting in bistable positioning of the individual locking claw. The individual locking claw may transition from an open position to a closed position under the influence of a closing force. The individual locking claw may transition from the closed position to the open position under the influence of an opening force. As a non-limiting example, the base object may be a boat and the clamped object may be a paddle. The invention may retain any item of sports, construction, or household equipment having a shaft by clamping onto the shaft of the item of equipment.

The platform base may be a foundational support for the pair of locking claws. Specifically, a first locking claw may pivotably couple to a first end of the platform base and a second locking claw may pivotably couple to a second end of the platform base. A motion limiter of the platform base may limit downwards pivoting of the pair of locking claws.

Counterclockwise pivoting of the first locking claw and clockwise pivoting of the second locking claw may move the pair of locking claws to the open position. Clockwise pivoting of the first locking claw and counterclockwise pivoting of the second locking claw may move the pair of locking claws to the closed position. Pressing the clamped object down into the invention between the pair of locking claws may apply the closing force to the first locking claw and to the second locking claw causing the first locking claw to pivot in a clockwise direction and the second locking claw to pivot in a counterclockwise direction, thus moving the pair of locking claws to the closed position. Pulling the clamped object up out of the invention may apply the opening force to the first locking claw and to the second locking claw causing the first locking claw to pivot in a counterclockwise direction and the second locking claw to pivot in a clockwise direction, thus moving the pair of locking claws to the open position.

The pair of locking claws may comprise the first locking claw and the second locking claw. The pair of locking claws may surround the clamped object when the pair of locking claws are in the closed position. The pair of locking claws may separate at the top when in the open position, such that the clamped object may be removed from between the pair of locking claws. The first locking claw and the second locking claw may be oriented in opposite directions.

The individual locking claw may comprise a spring. The spring may force the individual locking claw into one of two bistable positions—the open position and the closed position. The spring may exert a spring force between the platform base and the individual locking claw. The spring force may force the individual locking claw to remain in the open position if the individual locking claw is in the open position. The spring force may force the individual locking claw to remain in the closed position if the individual locking claw is in the closed position. The spring force may be overcome by the closing force to move the individual locking claw from the open position to the closed position. The spring force may be overcome by the opening force to move the individual locking claw from the closed position to the open position. As non-limiting examples, the spring may be a compression spring, a tension spring, a torsion spring, or a flat spring.

The individual locking claw selected from the first locking claw and the second locking claw may comprise a first lobe, a second lobe, and a third lobe. The individual locking claw may pivot around a pivot rod that passes through a pivot aperture located in the first lobe. The pivot rod may be coupled to the platform base. The second lobe may be the upper end of the individual locking claw and may retain the clamped object when the individual locking claw is in the closed position. The third lobe may be the lower end of the individual locking claw. The clamped object may push against the third lobe to move the individual locking claw to the closed position.

In some embodiments, the second lobe may comprise a security aperture. When the pair of locking claws are in the closed position the security aperture on the first locking claw may align with the security aperture on the second locking claw such that a lock may be installed through the security apertures to prevent the pair of locking claws from moving to the open position and releasing the clamped object. In some embodiments, the individual locking claw may comprise a coating. The coating may cover areas of the individual locking claw that may contact the clamped object. The coating may reduce slipping of the clamped object and may protect the clamped object from scratching. In some embodiments, the coating may cover the individual locking claw in its entirety.

In some embodiments, the individual locking claw may comprise a protective lining. The protective lining may couple to the individual locking claw and may be made from a different material than the individual locking claw. The protective lining may be positioned to cover areas of the individual locking claw that may contact the clamped object. The protective lining may reduce slipping of the clamped object and may protect the clamped object from scratching.

The mount may couple the platform base to the base object. In some embodiments, the mount may be armature that is coupled to the platform base and detachably couples to the base object. The mount may comprise a plurality of mounting apertures. The mount may be coupled to the base object via the plurality of mounting apertures using mounting hardware.

In some embodiments, the mount may comprise an adhesive. The mount may adhere to the base object via the adhesive. In some embodiments, the adhesive may be covered by an adhesive cover until use at which time the adhesive cover may be peeled off to expose the adhesive. In some embodiments, the mount may be a penetrable layer that may be coupled to the base object via stitches passing between the mounts and the base object. As a non-limiting example, the mount may be made from a textile and the mount may be stitched to a backpack. The mount may also be connected to a base structure such as a wall, vehicle, floor, or other surface by inserting fasteners such as screws, bolts, nails, or other fasteners through one or more fastening apertures positioned at one or more positions on the mount that permit the placement of the fastener through the mount and into the base structure to securely affix the mount to the base structure.

In some embodiments, the invention may comprise a locking armature. The locking armature may prevent the first locking claw from rotating to the open position when the first locking claw is in the closed position and the lock is in place through a first lock aperture and a second lock aperture. The locking armature may comprise an inside wall, an outside wall, an inside extension, an outside extension, and a bottom. The inside wall may be a horizontally-oriented armature located between the pair of locking claws and the platform base. The inside extension may be a vertical extension of the inside wall at the end of the inside wall that is closest to the first locking claw. The inside extension may comprise the first lock aperture. The outside wall may be a horizontally-oriented armature located on the opposite side of the pair of locking claws from the inside wall. The outside extension may be a vertical extension of the outside wall at the end of the outside wall that is closest to the first locking claw. The outside extension may comprise the second lock aperture. The inside wall and the outside wall may be coupled via the bottom.

The first locking claw may comprise an alignment notch located in the second lobe. The second locking claw may comprise an alignment bar located in the second lobe. The alignment bar may engage with the alignment notch when the first locking claw and the second locking claw are in the closed position. Engagement of the alignment notch and the alignment bar may prevent the second locking claw from lifting if the first locking claw is locked.

The locking armature may be coupled to the platform base by the pivot rods that the first locking claw and the second locking claw pivot around. In some embodiments, the pivot rods may pass through bushings to reduce friction of the pivoting components.

In some embodiments, the upper surface of the mount may comprise a mount track. The mount track may mate with a base track located on the platform base such that the mount may be coupled to the base object and the platform base may detachably couple to the mount by sliding the base track onto and off of the mount track. The base tack may be securely mounted to the platform base through the use of one or more fasteners such as, but not limited to, screws, nails, bolts, or other mechanical fasteners.

Turning now to FIG. 1, the figure shows the platform base 210 coupled to the mount 200 with the pair of locking claws 220 pivoted to the open position 290. The mount 200 may couple to the base object 900 via the plurality of mounting apertures 202. The motion limiter 212 that limits rotation of the first locking claw 222 and the second locking claw 224 is illustrated. The security aperture 238 on the first locking claw 222 and the security aperture 238 on the second locking claw 224 are separated and are not usable to lock the pair of locking claws 220 when the pair of locking claws 220 are in the open position 290. In this embodiments, the first locking claw 222 and the second locking claw 224 comprise the coating 242 to enhance the grip of the pair of locking claws 220 and to prevent marring.

Figure 2:
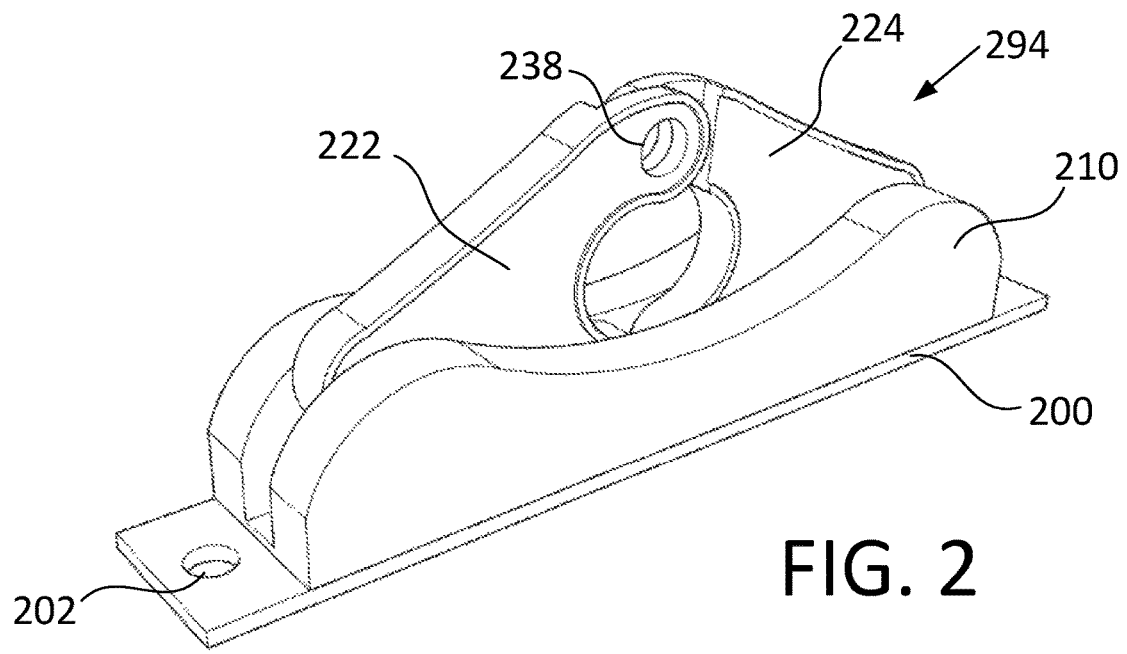
FIG. 2 is an isometric view of an embodiment of the disclosure illustrating the pair of claws in a closed position.

Turning now to FIG. 2, the figure shows the platform base 210 coupled to the mount 200 with the pair of locking claws 220 pivoted to the closed position 294. The mount 200 may couple to the base object 900 via the plurality of mounting apertures 202. In this embodiment, the security aperture 238 on the first locking claw 222 and the security aperture 238 on the second locking claw 224 are aligned and may be operable to lock the pair of locking claws 220 when the pair of locking claws 220 are in the closed position 294.

Figure 3:
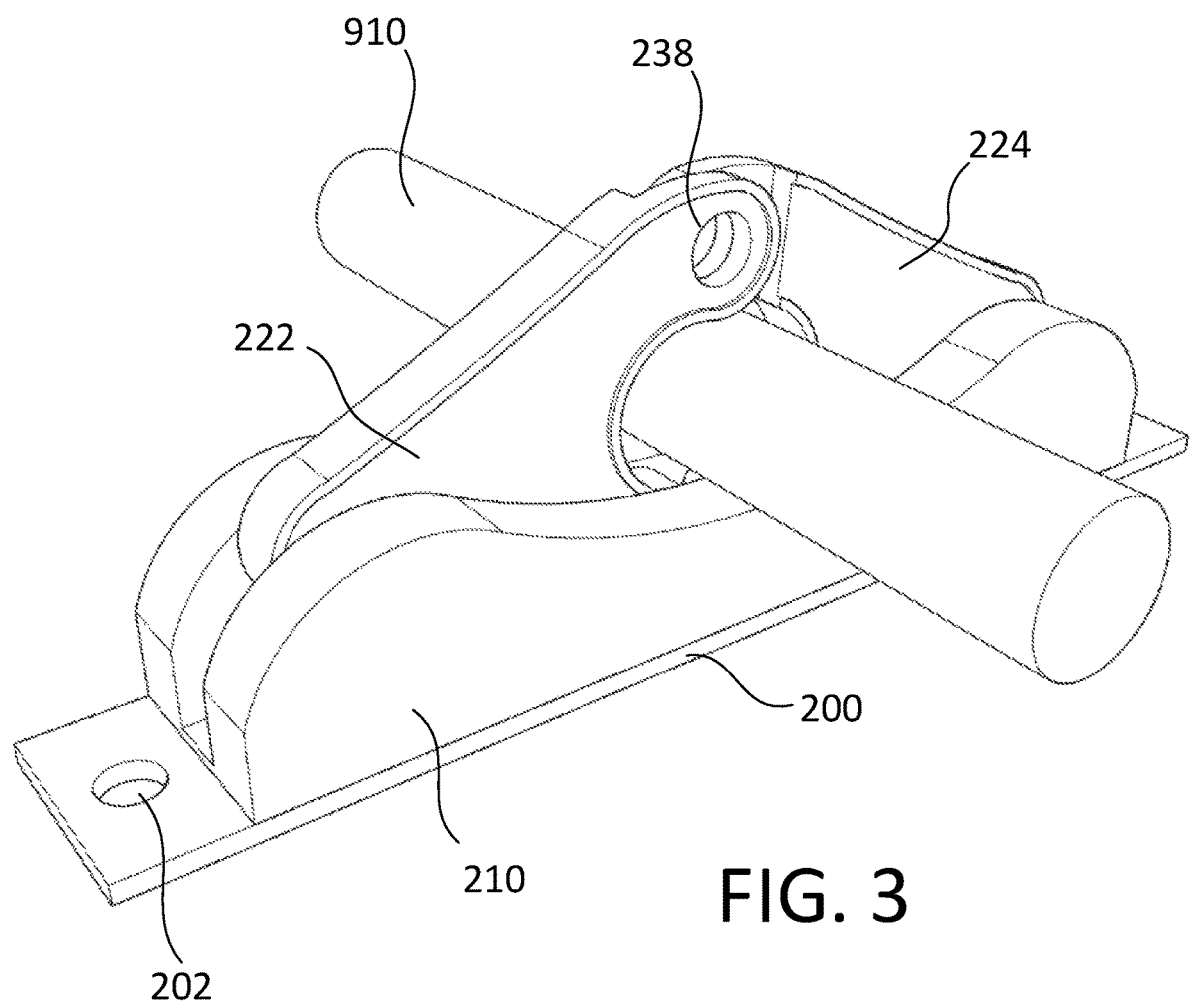
FIG. 3 is an isometric view of an embodiment of the disclosure illustrating the pair of claws retaining a clamped object.

Turning now to FIG. 3, the figure shows the platform base 210 coupled to the mount 200 with the pair of locking claws 220 pivoted to the closed position 294.

The mount 200 may couple to the base object 900 via the plurality of mounting apertures 202. In this embodiment, the security aperture 238 on the first locking claw 222 and the security aperture 238 on the second locking claw 224 are aligned and may be operable to lock the pair of locking claws 220 when the pair of locking claws 220 are in the closed position 294. The clamped object 910 is illustrated being retained by the pair of locking claws 220.

Figure 4:
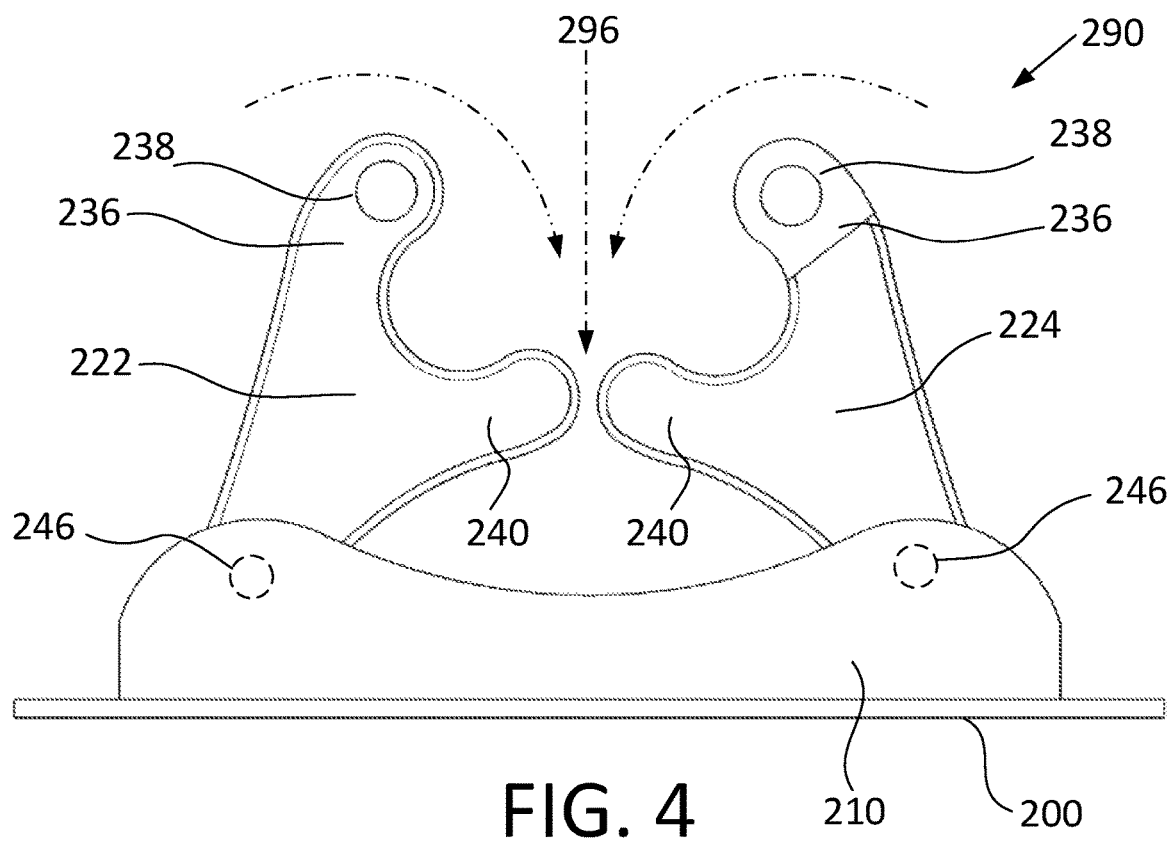
FIG. 4 is a side view of an embodiment of the disclosure illustrating the pair of claws in an open position.

Turning now to FIG. 4, the figure is a side view of the invention 100 while the pair of locking claws 220 are in the open position 290. The closing force 296 may be applied to the third lobe 240 of the first locking claw 222 and to the third lobe 240 of the second locking claw 224 by pressing the clamped object 910 into the space between the pair of locking claws 220 thus causing the first locking claw 222 to rotate clockwise and the second locking claw 224 to rotate counterclockwise. The first locking claw 222 and the second locking claw 224 may pivot around the pivot rods 246. This may cause the pair of locking claws 220 to transition from the open position 290 to the closed position 294. As the pair of locking claws 220 move to the closed position 294, the second lobe 236 of the first locking claw 222 and the second lobe 236 of the second locking claw 224 may move together until eventually the security apertures 238 on the first locking claw 222 and on the second locking claw 224 are aligned.

Figure 5:
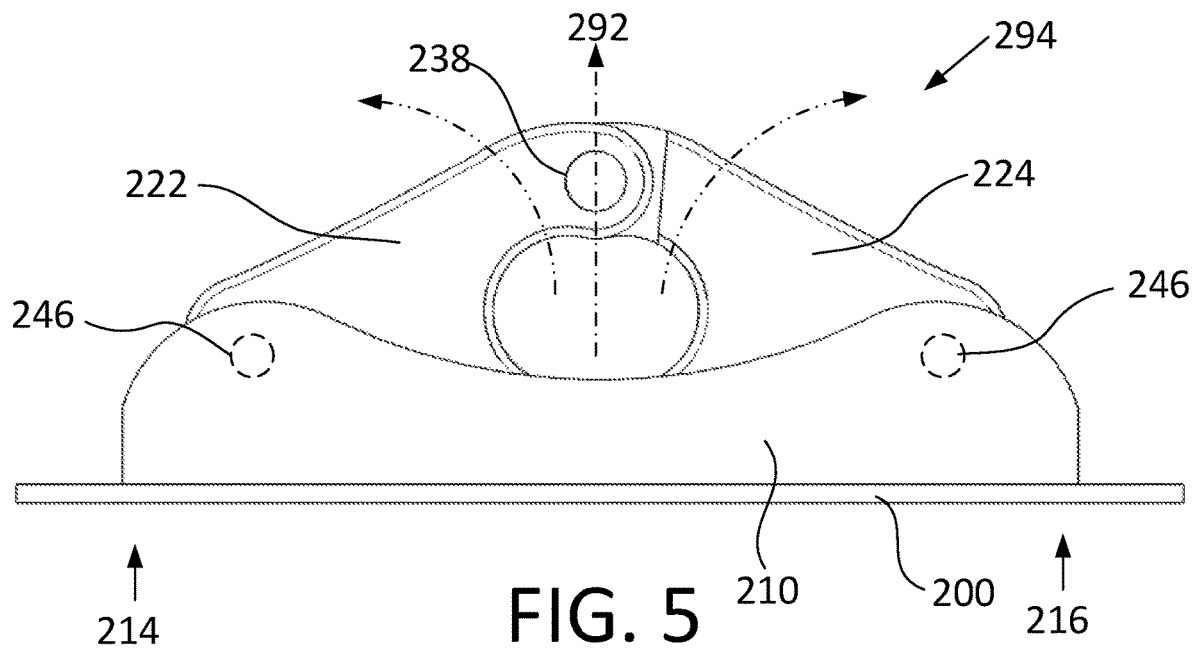
FIG. 5 is a side view of an embodiment of the disclosure illustrating the pair of claws in a closed position.

Turning now to FIG. 5, the figure is a side view of the invention 100 while the pair of locking claws 220 are in the closed position 294. The opening force 292 may be applied to the second lobe 236 of the first locking claw 222 and to the second lobe 236 of the second locking claw 224 by pulling the clamped object 910 upwards thus causing the first locking claw 222 to rotate counterclockwise and the second locking claw 224 to rotate clockwise. The first locking claw 222 and the second locking claw 224 may pivot around the pivot rods 246. This may cause the pair of locking claws 220 to transition from the closed position 294 to the open position 290. The lock installed through the security apertures 238 in the first locking claw 222 and the second locking claw 224 may prevent the pair of locking claws 220 from rotating. The first locking claw 222 is located at the first end 214 of the platform base 210 and the second locking claw 224 is located at the second end 216 of the platform base 210.

Figure 6:
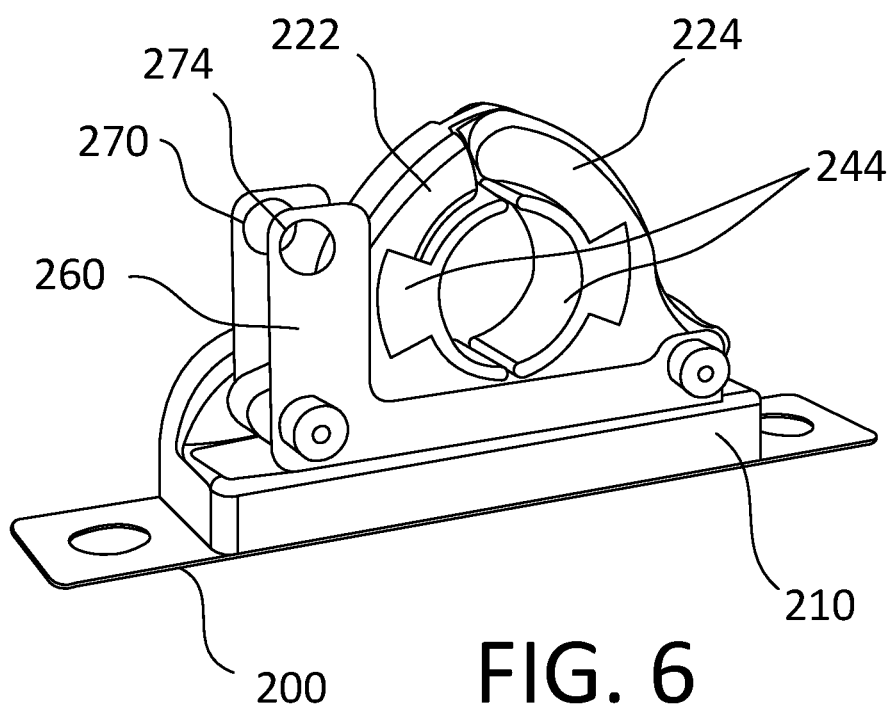
FIG. 6 is an isometric view of an alternative embodiment of the disclosure illustrating the locking armature.

Turning now to FIG. 6, the figure shows an embodiment of the invention 100 that comprises the locking armature 260. The locking armature 260 provides the first lock aperture 270 and the second lock aperture 274 that may prevent the first locking claw 222 from rotating out of the closed position 294 if the lock is installed on the locking armature 260. The first locking claw 222 may prevent the second locking claw 224 from rotating if the first locking claw 222 is locked using a mechanism illustrated in FIG. 8. FIG. 6 also illustrates the protective lining 244 on the first locking claw 222 and on the second locking claw 224. The protective lining 244 may enhance gripping and prevent marring.

Figure 7:
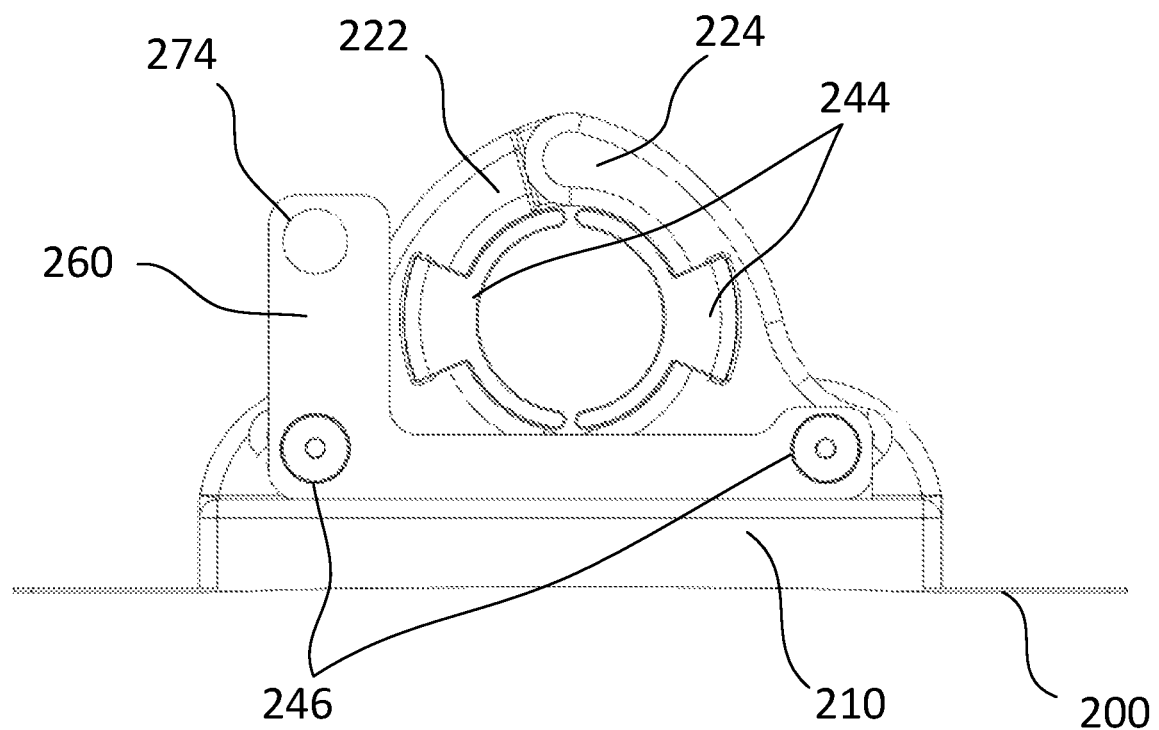
FIG. 7 is a side view of an alternative embodiment of the disclosure illustrating pair of claws in the closed position with a mount on the bottom of the platform base.

Turning now to FIG. 7, the figure shows a side view of the invention 100 comprising the locking armature 260 while in the closed position 294. In this embodiment, the mount 200 that is coupled to the platform base 210 may couple the invention 100 to the base object 900 and the first locking claw 222 and the second locking claw 224 may pivot to retain and to release the clamped object 910. The protective linings 244 on the first locking claw 222 and on the second locking claw 224 may enhance gripping and prevent marring. The first locking claw 222 and the second locking claw 224 may pivot around the pivot rods 246. The lock may optionally be installed on the locking armature 260.

Figure 8:
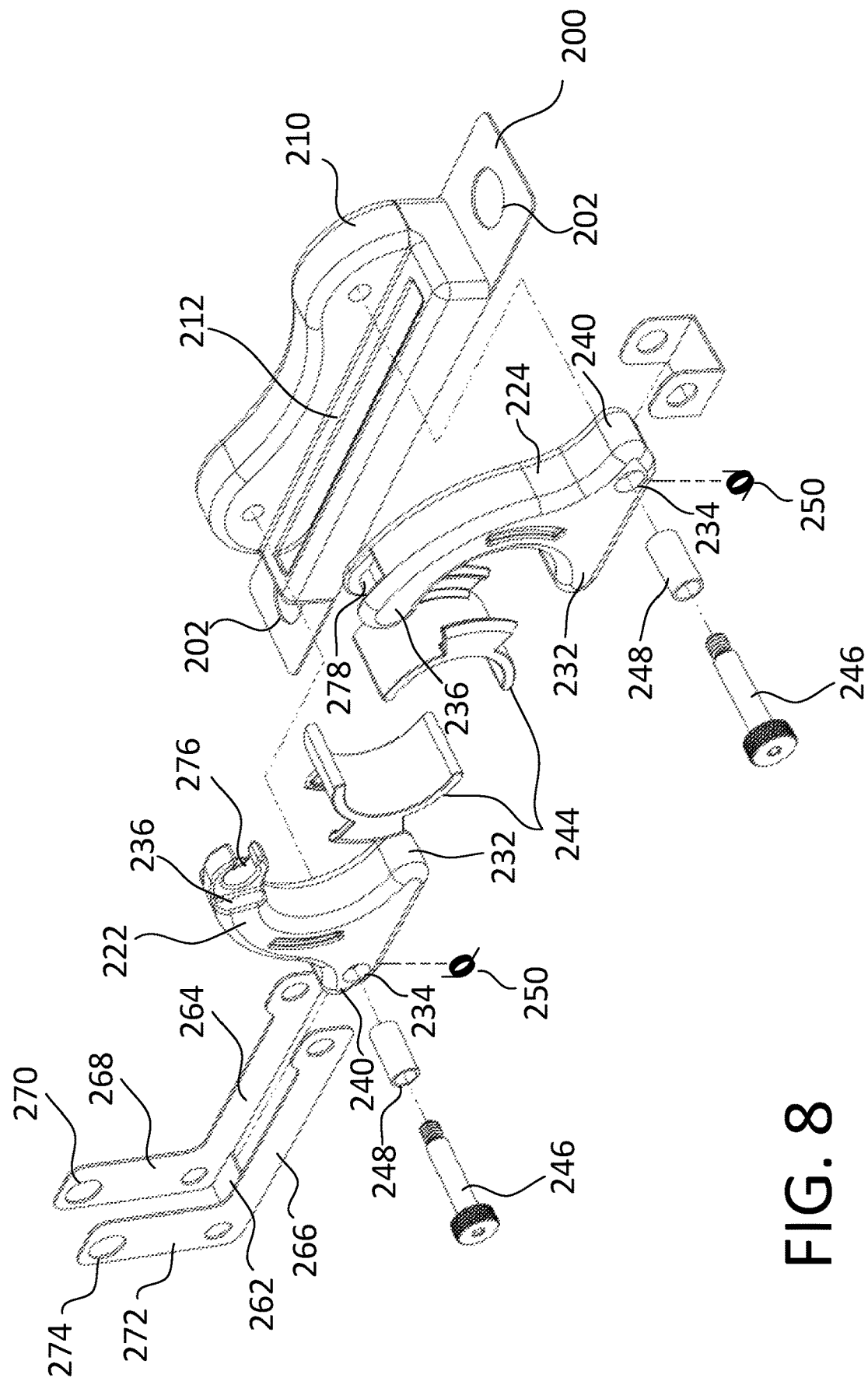
FIG. 8 is an exploded view of an alternative embodiment of the disclosure illustrating the mount on the bottom of the platform base.

Turning now to FIG. 8, the figure illustrates an exploded view of the invention 100 comprising the locking armature 260. The mount 200 with the plurality of mounting apertures 202 is coupled to the platform base 210 on the right. The motion limiter 212 is visible. The first locking claw 222 and the second locking claw 224 are shown along with the pivot rods 246 that the individual locking claw 230 pivots on. The springs 250 may force the first locking claw 222 and the second locking claw 224 into one of two bistable positions—the open position 290 and the closed position 294. The individual locking claw 230 comprises the first lobe 232 with the pivot aperture 234, the second lobe 236 at the top, and the third lobe 240 that the clamped object 910 may press against. The second lobe 236 of the first locking claw 222 comprises the alignment notch 276 and the second lobe 236 of the second locking claw 224 comprises the alignment bar 278. The alignment bar 278 may engage with the alignment notch 276 when the pair of locking claws 220 are in the closed position 294 such that the first locking claw 222 may prevent the second locking claw 224 from rotating if the first locking claw 222 is locked by the lock installed at the locking armature 260. The locking armature 260 may comprise the inside wall 264 and the outside wall 266 that are coupled by the bottom 262. The inside extension 268 and the outside extension 272 may project vertically to position the first lock aperture 270 and the second lock aperture 274 above the first locking claw 222 when the first locking claw 222 is in the closed position 294. The pivot rods 246 coupling the first locking claw 222 and the second locking claw 224 to the platform base 210 may pass through the bushings 248 to reduce friction. The protective linings 244 may line surfaces of the first locking claw 222 and the second locking claw 224 to enhance gripping and to prevent marring.

Figure 9:
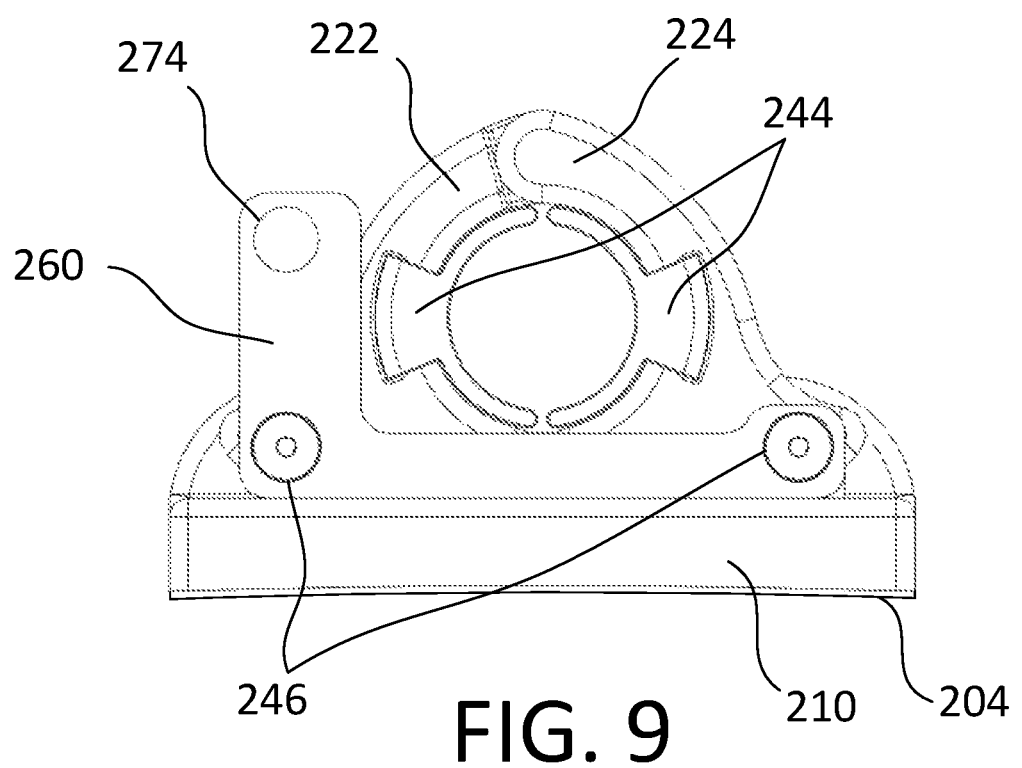
FIG. 9 is a side view of an alternative embodiment of the disclosure illustrating pair of claws in the closed position and an adhesive coupling on the bottom of the platform base.

Turning now to FIG. 9, the figure shows a side view of the invention 100 comprising the locking armature 260 while in the closed position 294. In this embodiment, the platform base 210 may couple the invention 100 to the base object 900 via the adhesive 204. The first locking claw 222 and the second locking claw 224 may pivot to retain and to release the clamped object 910. The protective linings 244 on the first locking claw 222 and on the second locking claw 224 may enhance gripping and prevent marring. The first locking claw 222 and the second locking claw 224 may pivot around the pivot rods 246. The lock may optionally be installed on the locking armature 260.

Figure 10:
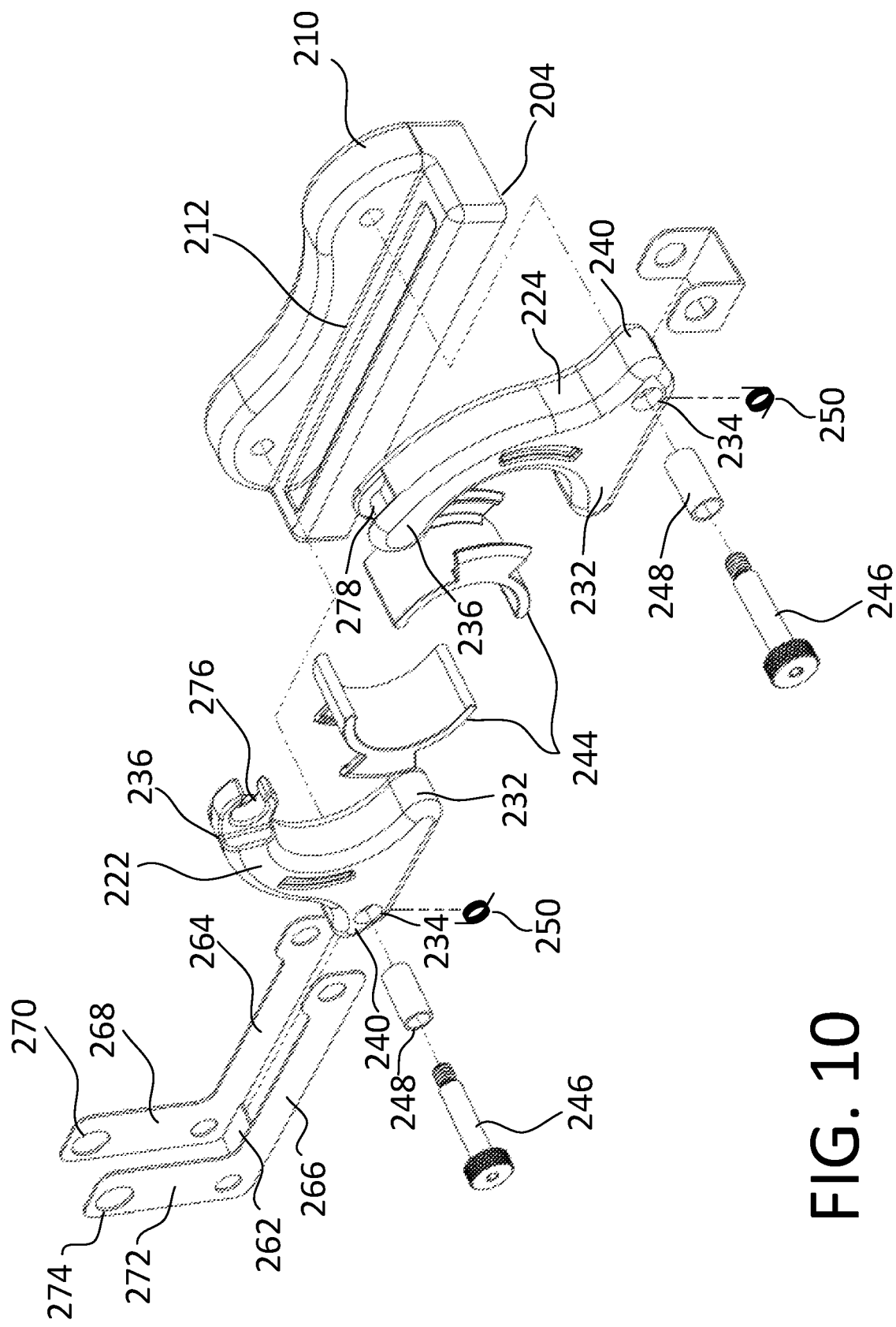
FIG. 10 is an exploded view of an alternative embodiment of the disclosure illustrating an adhesive coupling on the bottom of the platform base.

Turning now to FIG. 10, the figure illustrates an exploded view of the invention 100 comprising the locking armature 260. The platform base 210 may couple to the base object 900 via the adhesive 204. The motion limiter 212 is visible. The first locking claw 222 and the second locking claw 224 are shown along with the pivot rods 246 that the individual locking claw 230 pivots on. The springs 250 may force the first locking claw 222 and the second locking claw 224 into one of two bistable positions—the open position 290 and the closed position 294. The individual locking claw 230 comprises the first lobe 232 with the pivot aperture 234, the second lobe 236 at the top, and the third lobe 240 that the clamped object 910 may press against. The second lobe 236 of the first locking claw 222 comprises the alignment notch 276 and the second lobe 236 of the second locking claw 224 comprises the alignment bar 278. The alignment bar 278 may engage with the alignment notch 276 when the pair of locking claws 220 are in the closed position 294 such that the first locking claw 222 may prevent the second locking claw 224 from rotating if the first locking claw 222 is locked by the lock installed at the locking armature 260. The locking armature 260 may comprise the inside wall 264 and the outside wall 266 that are coupled by the bottom 262. The inside extension 268 and the outside extension 272 may project vertically to position the first lock aperture 270 and the second lock aperture 274 above the first locking claw 222 when the first locking claw 222 is in the closed position 294. The pivot rods 246 coupling the first locking claw 222 and the second locking claw 224 to the platform base 210 may pass through the bushings 248 to reduce friction. The protective linings 244 may line surfaces of the first locking claw 222 and the second locking claw 224 to enhance gripping and to prevent marring.

Figure 11:
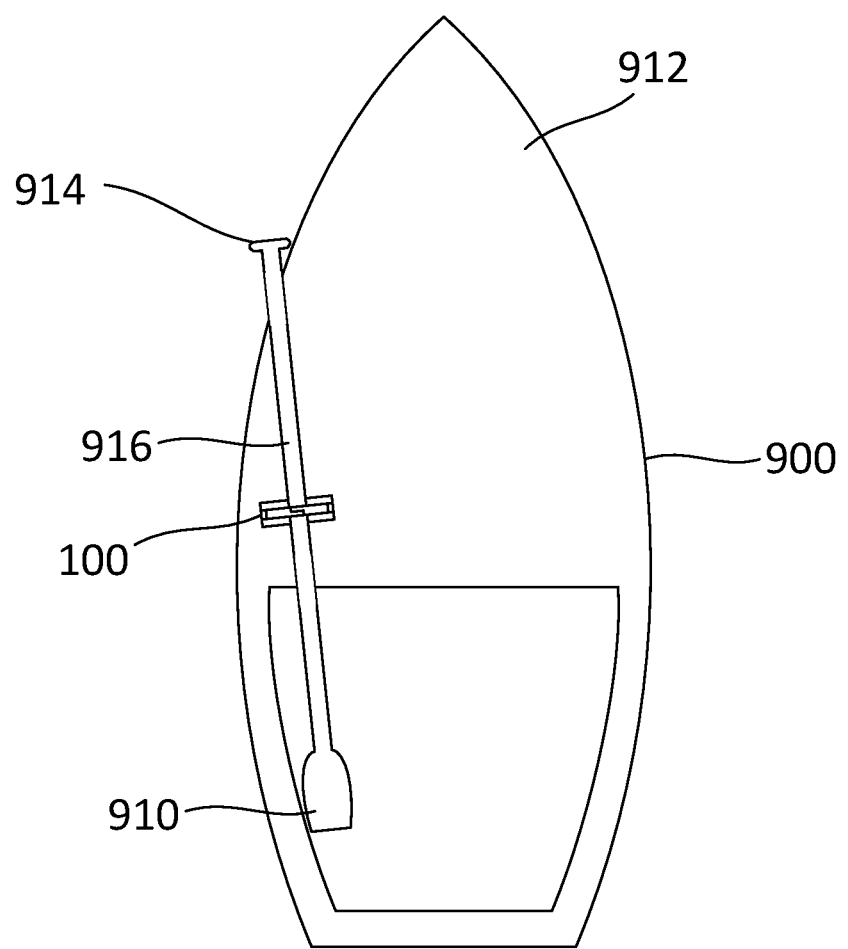
FIG. 11 is an in-use view of an embodiment of the disclosure illustrating the invention retaining a paddle to a boat.

Turning now to FIG. 11, illustrates use of the invention 100. As shown, the invention 100 has been coupled to the top surface of the base object 900 which, in this case, is the boat 912. The clamped object 910, the paddle 914, has been placed into the invention 100 to retain the paddle 914 to the boat 912. In this illustration, the invention 100 grasps the shaft 916 of the paddle 914 to retain the paddle 914.

In use, the invention 100 may be coupled to a base object 900 using a plurality of mounting apertures 202 or an adhesive 204. As a non-limiting example, the base object 900 may be a boat 912. A clamped object 910 may be retained by the invention 100 by placing a portion of the clamped object 910 between a pair of locking claws 220 and pressing the clamped object 910 into the invention 100. As a non-limiting example, the clamped object 910 may be a paddle 914 and a shaft 916 of the paddle 914 may be placed between the pair of locking claws 220 and pressed into the pair of locking claws 220. The pair of locking claws 220 may rotate from an open position 290 to a closed position 294. To remove the clamped object 910 from the invention 100, the clamped object 910 may be pulled away from the pair of locking claws 220 such that the pair of locking claws 220 rotate from the closed position 294 to the open position 290. The clamped object 910 may be locked into place within the pair of locking claws 220 when the pair of locking claws 220 are in the closed position 294 by either passing a lock through a security aperture 238 located on a second lobe 236 of a first locking claw 222 and a second locking claw 224 or by passing the lock through a first lock aperture 270 and a second lock aperture 274 located on a locking armature 260, depending upon the embodiment.

While certain illustrative embodiments have been described, it is evident that many alternatives, modifications, permutations and variations will become apparent to those skilled in the art in light of the foregoing description.

What is claimed is:

1. A clamping device comprising
  a platform base, a pair of locking claws, and a mount, a side mount locking armature, and alignment notch and an alignment bar;
  where the clamping device is coupled to a base object via the mount;
  where the clamping device retains a clamped object to the base object using the pair of locking claws;
  where an individual locking claw selected from the pair of locking claws comprises an over-center position resulting in bistable positioning of the individual locking claw;
  where the over-center position permits a single soring to maintain a locking claw element in either an open position or a closed position based upon overcoming the force of the spring element connected to the bottom of the claw element in either an open or closed position;

where the individual locking claw transitions from an open position to a closed position under the influence of a closing force;

where the alignment notch engages with the alignment bar in said closed position to securely prevent rotation by either individual locking claw when locked in said closed position through engagement of said side mount locking armature;

where the individual locking claw transitions from the closed position to the open position under the influence of an opening force.

2. The clamping device according to claim 1
where the platform base is a foundational support for the pair of locking claws;

where the first locking claw pivotably couples to a first end of the platform base and the second locking claw pivotably couples to a second end of the platform base;

where a motion limiter of the platform base limits downwards pivoting of the pair of locking claws.

3. The clamping device according to claim 2
where counterclockwise pivoting of the first locking claw and clockwise pivoting of the second locking claw move the pair of locking claws to the open position;

where clockwise pivoting of the first locking claw and counterclockwise pivoting of the second locking claw move the pair of locking claws to the closed position;

where pressing the clamped object down into the clamping device between the pair of locking claws applies the closing force to the first locking claw and to the second locking claw causing the first locking claw to pivot in a clockwise direction and the second locking claw to pivot in a counterclockwise direction, thus moving the pair of locking claws to the closed position;

where pulling the clamped object up out of the clamping device applies the opening force to the first locking claw and to the second locking claw causing the first locking claw to pivot in a counterclockwise direction and the second locking claw to pivot in a clockwise direction, thus moving the pair of locking claws to the open position.

4. The clamping device according to claim 3
where the pair of locking claws comprises the first locking claw and the second locking claw;

where the pair of locking claws surrounds the clamped object when the pair of locking claws are in the closed position;

where the pair of locking claws separate at the top when in the open position, such that the clamped object is removed from between the pair of locking claws;

where the first locking claw and the second locking claw are oriented in opposite directions.

5. The clamping device according to claim 4
where the individual locking claw comprises a spring;

where the spring forces the individual locking claw into one of two bistable positions—the open position and the closed position;

where the spring exerts a spring force between the platform base and the individual locking claw;

where the spring force forces the individual locking claw to remain in the open position if the individual locking claw is in the open position;

where the spring force forces the individual locking claw to remain in the closed position if the individual locking claw is in the closed position;

where the spring force is overcome by the closing force to move the individual locking claw from the open position to the closed position;

where the spring force is overcome by the opening force to move the individual locking claw from the closed position to the open position.

6. The clamping device according to claim 5
where the individual locking claw selected from the first locking claw and the second locking claw comprises a first lobe, a second lobe, and a third lobe;

where the individual locking claw pivots around a pivot rod that passes through a pivot aperture located in the first lobe;

where the pivot rod is coupled to the platform base;

where the second lobe is the upper end of the individual locking claw and retains the clamped object when the individual locking claw is in the closed position;

where the third lobe is the lower end of the individual locking claw;

where the clamped object pushes against the third lobe to move the individual locking claw to the closed position.

* * * * *